US010428844B1

(12) United States Patent
Holt

(10) Patent No.: US 10,428,844 B1
(45) Date of Patent: Oct. 1, 2019

(54) METHOD AND SYSTEM FOR GENERATING ELECTRICAL POWER FROM A WHEELED ENGINE-DRIVEN VEHICLE FOR POWERING A TRANSPORT REFRIGERATION UNIT

(71) Applicant: Eugene Holt, Coos Bay, OR (US)

(72) Inventor: Eugene Holt, Coos Bay, OR (US)

( * ) Notice: Subject to any disclaimer, the term of this patent is extended or adjusted under 35 U.S.C. 154(b) by 0 days.

(21) Appl. No.: 16/152,146

(22) Filed: Oct. 4, 2018

Related U.S. Application Data

(60) Provisional application No. 62/664,410, filed on Jun. 8, 2018.

(51) Int. Cl.
| *F15B 11/00* | (2006.01) |
| *F15B 11/10* | (2006.01) |
| *B60P 3/20* | (2006.01) |
| *B60R 16/03* | (2006.01) |

(52) U.S. Cl.
CPC ........... *F15B 11/10* (2013.01); *B60P 3/20* (2013.01); *B60R 16/03* (2013.01); *F15B 2211/20576* (2013.01); *F15B 2211/25* (2013.01); *F15B 2211/7058* (2013.01)

(58) Field of Classification Search
CPC .......... F15B 11/10; F15B 2211/25; B60P 3/20
See application file for complete search history.

(56) References Cited

U.S. PATENT DOCUMENTS

| 2,986,896 | A | | 6/1961 | Hann | |
| 3,841,108 | A | * | 10/1974 | Pierrat | B60H 1/3222 62/236 |
| 5,177,978 | A | * | 1/1993 | Brown | B60H 1/3222 62/236 |
| 5,867,996 | A | * | 2/1999 | Takano | B60H 1/3222 62/175 |
| 6,662,586 | B2 | | 12/2003 | Kooi | |
| 7,086,241 | B2 | * | 8/2006 | Holt | B60H 1/00435 60/456 |
| 8,776,928 | B2 | * | 7/2014 | Stover, Jr. | B60P 3/20 180/165 |
| 9,389,007 | B1 | | 7/2016 | McKay | |
| 9,707,844 | B2 | | 7/2017 | Arnold et al. | |
| 2006/0117744 | A1 | * | 6/2006 | Ummenhofer | B60W 10/06 60/426 |
| 2010/0219007 | A1 | * | 9/2010 | Dalum | B60L 50/16 180/65.22 |
| 2014/0033692 | A1 | * | 2/2014 | Nelson | B60K 6/12 60/327 |
| 2016/0290369 | A1 | * | 10/2016 | Opdenbosch | F02D 29/04 |
| 2016/0319496 | A1 | * | 11/2016 | Wiktor | E01C 19/286 |
| 2017/0107697 | A1 | * | 4/2017 | Kawashima | E02F 9/22 |
| 2018/0014278 | A1 | * | 1/2018 | Papasakellariou | H04L 5/14 |
| 2018/0142782 | A1 | * | 5/2018 | Lindinger | F16H 61/4017 |

* cited by examiner

*Primary Examiner* — Hau V Phan

(74) *Attorney, Agent, or Firm* — Birdwell & Janke, LLP

(57) ABSTRACT

A method and system for generating electrical power from a wheeled engine-driven vehicle. At least two hydraulic pumps are provided for pumping hydraulic fluid though respective hydraulic fluid outputs of the hydraulic pumps. A first one of the hydraulic pumps is driven by the engine of the vehicle and a second one of the hydraulic pumps is driven by one or more of the road-wheels of the vehicle. Hydraulic fluid pumped by the first and second hydraulic pumps is input in parallel to a hydraulic motor.

14 Claims, 5 Drawing Sheets

METHOD AND SYSTEM FOR GENERATING ELECTRICAL POWER FROM A WHEELED ENGINE-DRIVEN VEHICLE FOR POWERING A TRANSPORT REFRIGERATION UNIT

RELATED APPLICATIONS

This application claims the priority and benefit of U.S. provisional application Ser. No. 62/664,410, filed Jun. 8, 2018.

FIELD OF INVENTION

The present invention relates generally to the art of vehicular electrical power generation; and more specifically to systems for use in trucks and tractor/semi-trailer combinations for powering an electric transport refrigeration unit attached to the truck or semi-trailer.

BACKGROUND OF INVENTION

Transport refrigeration units (in singular, "TRU") have been used for many years in semi-trailers for hauling goods that must be kept refrigerated, such as food products susceptible to spoilage or melting. The power needed for driving a full size TRU is about 30 horsepower.

Refrigeration systems generally have three basic components for performing a refrigeration cooling cycle: a compressor for raising the pressure of a vaporized refrigerant; a condenser for allowing the compressed vaporized refrigerant to condense to a liquid form and thereby to absorb heat from a volume to be cooled; and an evaporator for allowing the condensed and now warmed refrigerate to evaporate and thereby to give off the absorbed heat to the environment. The evaporated refrigerant is then returned to the compressor from the condenser to repeat the cycle. The compressor is driven by an engine or motor to provide the power needed for the cooling cycle.

Some small trucks have cargo refrigeration units where the compressor is mounted in the truck engine bay and turned by a belt wrapped around a pulley take off from the crankshaft of the truck engine. Essentially the same system configuration is used in passenger automobile air conditioning systems.

U.S. Pat. No. 7,086,241 to Holt describes a hydraulic power unit for a refrigeration system that would typically be used in a diesel truck tractor and semi-trailer combination that drives the compressor with a hydraulic motor, the hydraulic motor being driven in turn by hydraulic fluid circulated by a hydraulic pump turned by the truck engine.

Many TRU's employ an electric motor for turning the compressor, where the electricity that is needed for powering the electric motor is generated by a small, on-board diesel engine and generator combination. Such a diesel TRU is shown in U.S. Pat. No. 8,776,928.

The '928 Patent describes a regenerative electric drive methodology that also employs a hydraulic pump for powering a diesel TRU. The hydraulic pump is driven by a differential of an axle of the truck and drives a remotely located hydraulic motor and generator combination for generating electricity that can be switched in to the TRU as an alternate source of electric power for the TRU when the truck engine is available to produce this power and the dedicated diesel engine in the TRU is therefore not needed.

SUMMARY OF INVENTION

A method and system for generating electrical power from a wheeled engine-driven vehicle for powering a transport refrigeration unit is disclosed.

Two hydraulic pumps produce fluid power from mechanical power by pumping hydraulic fluid. A first one of the hydraulic pumps is adapted for obtaining mechanical power from the engine of the vehicle, and the second one of the hydraulic pumps is adapted for obtaining mechanical power from one or more of the road-wheels of the vehicle.

A hydraulic circuit that includes a hydraulic motor is also disclosed. Hydraulic fluid pumped by the two hydraulic pumps is provided to the hydraulic circuit in parallel through a fluid power input of the hydraulic circuit, and wherein the hydraulic motor is adapted for producing mechanical power from fluid flowing through the fluid power input, through the hydraulic motor, and back out of the hydraulic circuit for re-supplying hydraulic fluid as needed to the first and second hydraulic pumps.

The two hydraulic pumps may have respective fluid feedback inputs and pressure compensators responsive to the fluid feedback inputs; the fluid feedback inputs of the two hydraulic pumps may be adapted to obtain feedback for the feedback inputs from hydraulic fluid tapped from the hydraulic circuit downstream of the pump power output of the hydraulic circuit and upstream of the hydraulic motor; and the pressure compensator setting for the first one of the pumps may be at least 50 psi higher than the pressure compensator setting for the second one of the pumps.

The system may also include a generator for producing electrical power obtained from the mechanical power generated by the hydraulic motor.

The system may further include a refrigeration unit attached to the vehicle adapted for being electrically driven by power obtained from the generator.

The vehicle may be a tractor and semi-trailer combination; the one or more of the road-wheels may be driven road-wheels of the tractor; and the refrigeration unit may be a transport refrigeration unit for the semi-trailer and may be attached thereto.

A method for generating power from a wheeled vehicle having an engine and one or more road-wheels is also disclosed. The method includes providing at least two hydraulic pumps for pumping hydraulic fluid through respective hydraulic fluid outputs of the hydraulic pumps; driving a first one of the hydraulic pumps by the engine of the vehicle and driving a second one of the hydraulic pumps by one or more of the road-wheels of the vehicle; and providing the hydraulic fluid outputs from the first and second hydraulic pumps in parallel to a hydraulic motor.

The two hydraulic pumps may have respective fluid feedback inputs and pressure compensators responsive to the fluid feedback inputs, and the hydraulic fluid outputs of the first and second hydraulic pumps may be connected together in parallel at a fluid power input of a hydraulic circuit that supplies the hydraulic fluid output from the first and second hydraulic pumps to the hydraulic motor. The method may include obtaining feedback for the feedback inputs from hydraulic fluid tapped from the hydraulic circuit downstream of the fluid power input and upstream of the hydraulic motor, and setting a pressure compensator of the first one of the pumps to be at least 50 psi higher than the pressure compensator setting for the second one of the pumps.

The method may be used to obtain electrical power from the mechanical power generated by the hydraulic motor.

The electrical power may be used to power a refrigeration unit attached to the vehicle.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

DESCRIPTION OF PREFERRED EMBODIMENTS

Figure 1:
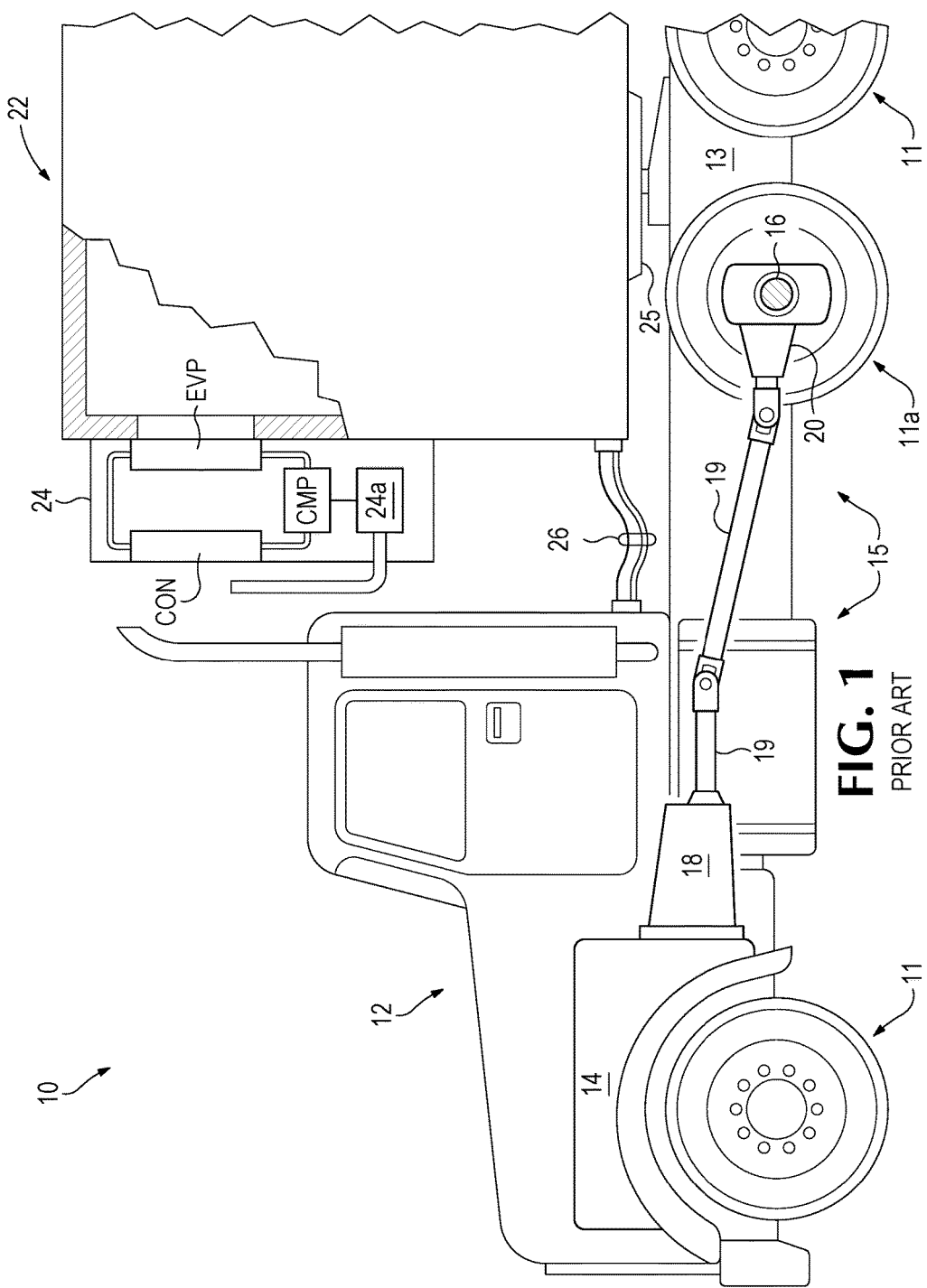
FIG. 1 is a schematic diagram of a tractor and semi-trailer equipped with a transport refrigeration unit according to the present invention.

FIG. 1 shows a combination tractor and semi-trailer combination 10. A tractor portion 12 of the combination is driven for over-the-road transport by an internal combustion engine 14, typically a diesel engine. The tractor/trailer combination 10 is a wheeled vehicle. Road-wheels 11 of the tractor 12 are visible. A semi-trailer portion 22 of the tractor/trailer combination 10 also has road-wheels 11, but they are not visible in the Figure. The road-wheels referenced particularly as 11a are driving road-wheels, driven by the engine 14 to drive the tractor/tractor combination 10. The remaining road-wheels are driven by the kinetic energy of the tractor/trailer combination 10.

As is typical for a road-going vehicle, the engine 14 of the tractor 12 is coupled to a drive axle 16 through a transmission 18, a drive shaft 19, and a differential 20 that is incorporated in the drive axle.

Also, as is typical for the tractor portion of a tractor and semi-trailer combination, the tractor 12 has a towing hitch 25 and repeatably connectable and disconnectable connecting lines 26 for connecting a semi-trailer 22, for providing electrical power from the tractor to the semi-trailer for powering road-going necessities on the semi-trailer such as night driving, turn, and braking lights, and for providing pneumatic power from the tractor to the semi-trailer for operating brakes on the semi-trailer.

The semi-trailer 22 may include what will be referred to herein as a standard diesel TRU 24. As for any refrigeration unit, the diesel TRU 24 includes a compressor "CMP," an evaporator "EVP," and a condenser "CON." A small diesel engine 24a is also provided for turning the compressor and thereby powering the refrigeration cycle of the TRU 24. For reference, the tractor engine 14 is typically at least ten times as powerful as the engine in a diesel TRU.

Figure 2:
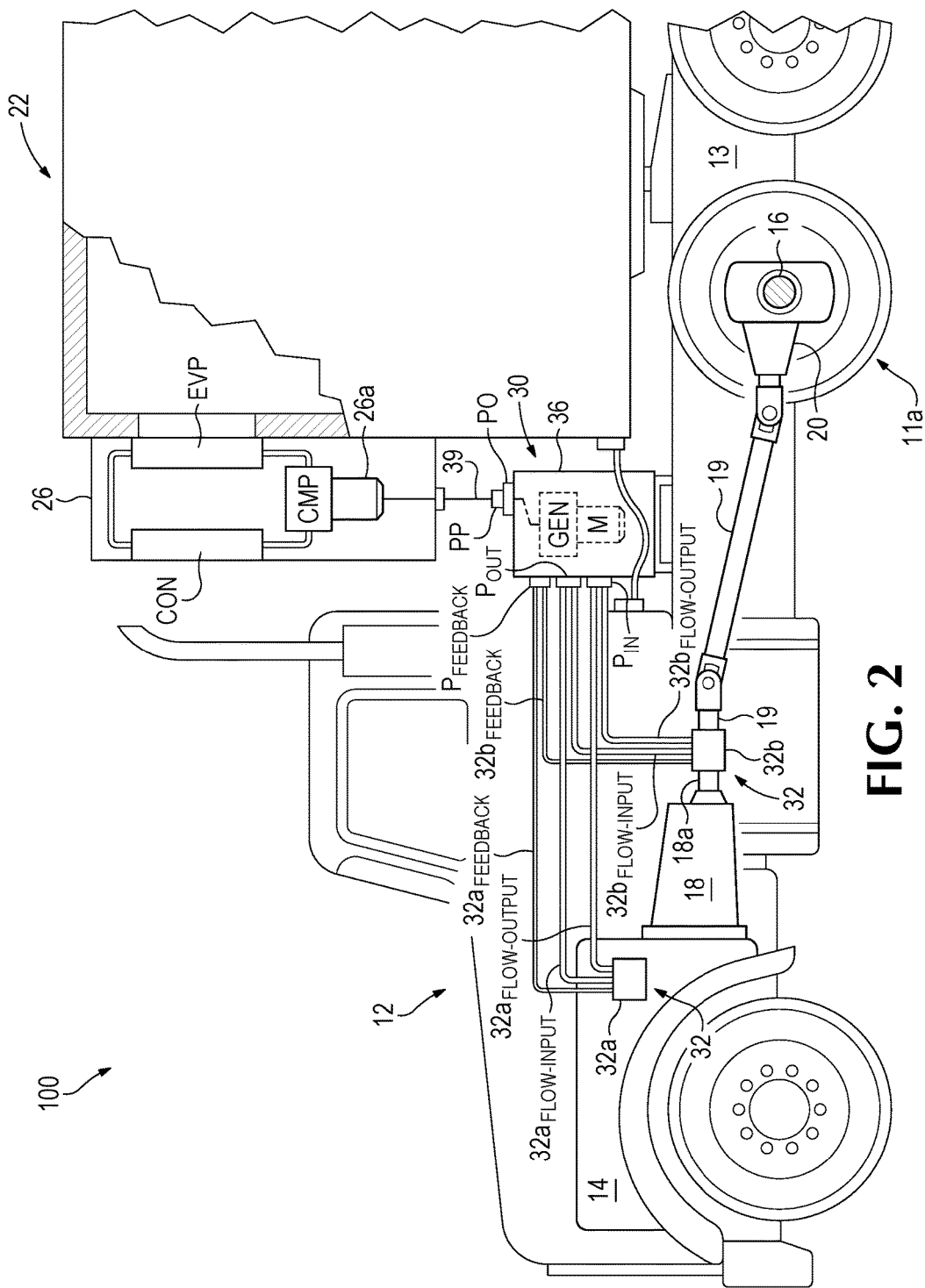
FIG. 2 is a schematic diagram of the tractor and semi-trailer combination and transport refrigeration unit of FIG. 1, including a system for generating power from the tractor portion of the combination and powering the transport refrigeration unit according to the present invention.

FIG. 2 shows a tractor/trailer combination 100 according to the present invention, which may be referred to more generally as a road-going vehicle. The tractor 12 may be propelled by the same engine 14, or by the engine 14 in combination with one or more electric motors that obtain some or all of their electric power from a generator powered by the engine.

For purposes herein the term "generator" is not limited to devices that convert mechanical power to direct electrical current (DC) and therefore include devices that produce alternating electrical current (AC) power unless otherwise noted.

Also for purposes herein, the term "drive train" refers to any component of the vehicle, broadly the engine, transmission, drive shaft(s), differential(s), axle(s), driven road-wheel(s) of the vehicle, and any components thereof, which contributes to producing or transferring mechanical power for driving the vehicle over the road. Such power is produced at the engine, where mechanical power is produced from chemical energy stored in fuel, and from there the power flows "downstream" through the drive train and ultimately to the road-wheels.

The tractor/trailer combination 100 may be provided with an alternative TRU 26 according to the present invention. The TRU 26 may omit the diesel engine 24a of the TRU 24, and employ an electric motor 26a for powering the refrigeration cycle instead, although a diesel or other internal combustion engine could also be provided for use in combination with the electric motor.

The electric motor 26a may be an AC or a DC driven motor, but preferably it is AC driven so that the TRU 26 can be powered by electricity obtained from the AC electrical power grid, allowing for maintaining operation of the TRU 26 when the tractor is parked at a truck stop or the like where grid power is available. The TRU 26 may be provided with an auxiliary electrical power input connector "AEPC" connected to the electrical power input of the electric motor 26a for this purpose.

The tractor 12 may also be provided with an over-the-road power system 30 for powering the TRU 26 when no external source of electrical power is available.

The system 30 may include two hydraulic pumps 32 for generating mechanical power for powering the TRU 26; i.e., an engine-driven hydraulic pump 32a may be mechanically coupled to and therefore driven by the engine 14 of the tractor 12, and a road-wheel-driven hydraulic pump 32b may be mechanically coupled to and therefore driven by any portion of the tractor/trailer combination 100 that is coupled to a road-wheel, whether the road-wheel is being driven by the kinetic energy of the tractor/trailer combination, or the road-wheel is driving the tractor/trailer combination and therefore increasing or maintaining the kinetic energy of the tractor/trailer combination.

The engine-driven pump 32a is "engine-driven" by obtaining power from any part of the drive train of a road-going vehicle like the tractor/trailer combination 100 that is "upstream," in terms of the power flow direction noted above, of the output 18a of the transmission 18. By contrast, the road-wheel-driven pump 32b is "road-wheeldriven" by obtaining power from any part of the drive train of the vehicle that is downstream of the output 18a of the transmission; or it may be also be "road-wheel-driven" by any component apart from the drive train of the vehicle that obtains power from a road-wheel. For example, kinetic energy for driving the pump 32b could be obtained through non-driven road-wheels, such as the wheels of the semi-trailer 22. Kinetic energy for driving the pump 32b could also be obtained by an accessory road-wheel that is added to the tractor/trailer combination 100 for this dedicated purpose. Such a road-wheel may advantageously be attached to a mechanism that can raise and lower the road-wheel as needed to make contact with the pavement when there is demand for electrical power generation and/or when the vehicle is moving.

Figure 3A:
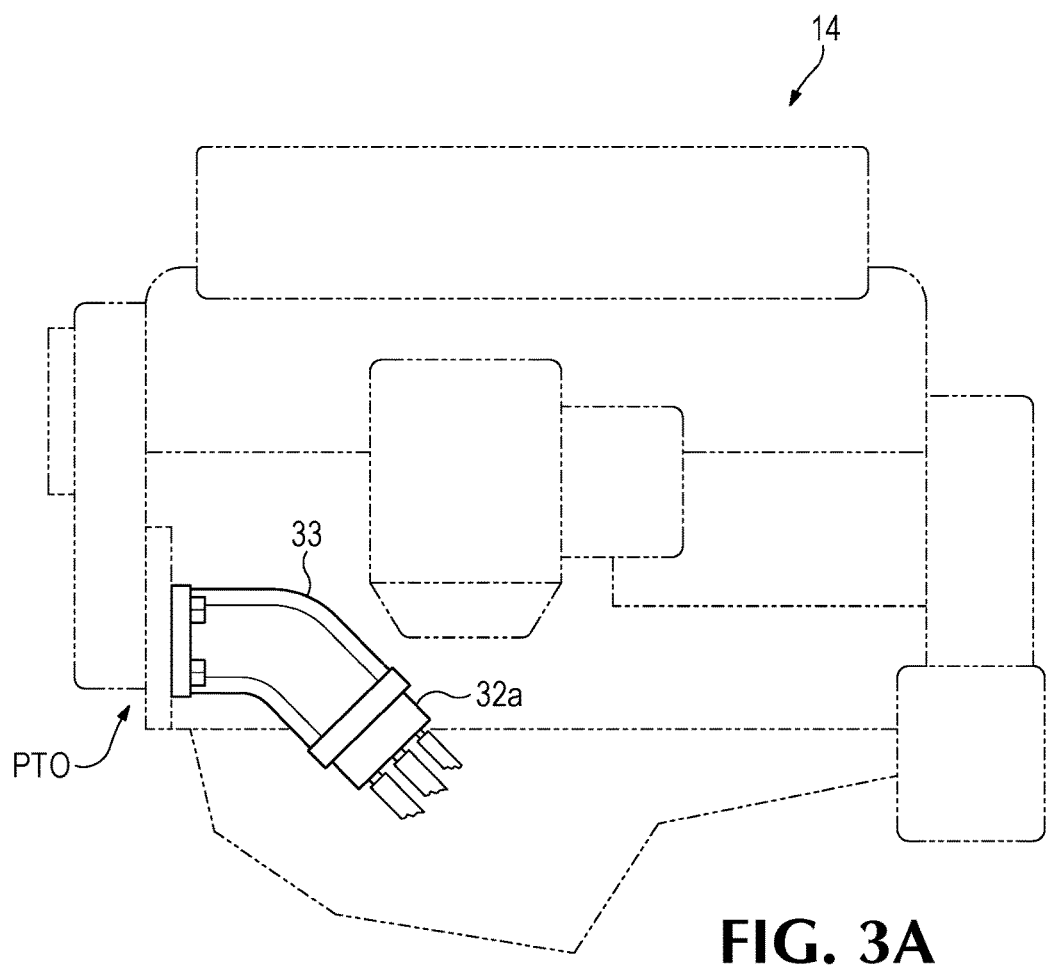
FIG. 3A is a side elevation of an engine for driving the tractor of FIGS. 1 and 2, with a first hydraulic pump mounted to the engine and connected to a power take-off of the engine via a commercially available adaptor.

Referring to FIG. 3A, in a preferred embodiment of the tractor/trailer combination 100, the engine 14, as is typical for diesel truck engines, includes a gear drive provided as a standard power take-off "PTO" from the front of the engine. The engine-driven pump 32a can be mounted to the PTO, so that it will be driven by PTO, through a commercially available adaptor 33. One example for a Scania ED 90 engine is the PTO adaptor kit available from the Parker Hannifin Corporation (aka "Parker") of Mayfield Heights, Ohio, as catalog no. HY13-1553-003US.

Figure 3B:
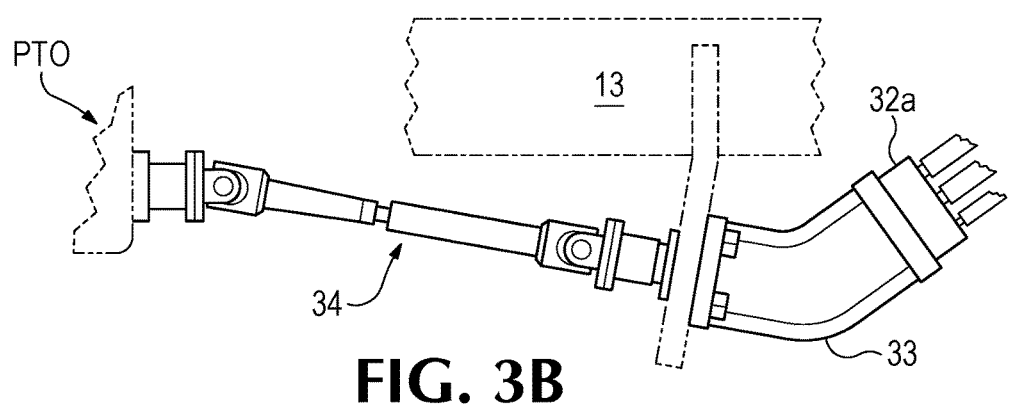
FIG. 3B is a fragmentary side elevation of the engine, hydraulic pump, and adaptor of FIG. 3A, with the first hydraulic pump mounted to a first portion of the frame of the tractor and connected to the power take-off of the engine via the adaptor and a drive shaft.

FIG. 3B shows an additional adaption available from the same source, as catalog no. HY13-1553-002US, in which a universal-jointed drive shaft 34 is used to connect the adaptor 33 to the PTO, so that the pump 32a can be mounted to the frame 13 rather than to the engine.

As another alternative, the pump 32a could be mounted either to a bracket attached to the engine block or to a portion of a frame 13 of the tractor that is inside the engine bay and driven through a belt system coupled to the PTO, similar to the manner in which automobile air conditioning systems are provided. If the pump 32a is attached to the frame 13 of the tractor, the belt system may include a belt tensioner to accommodate relative movements of the engine and frame due to the engine mounts.

There are many possible means for mounting the pump 32a to the tractor/trailer combination 100 and for coupling the pump to the engine 14 so as to draw mechanical power from the engine as will be readily appreciated by those of ordinary skill, including means that employ intermediate mechanical, hydraulic, pneumatic, or electrical systems.

Figure 4A:
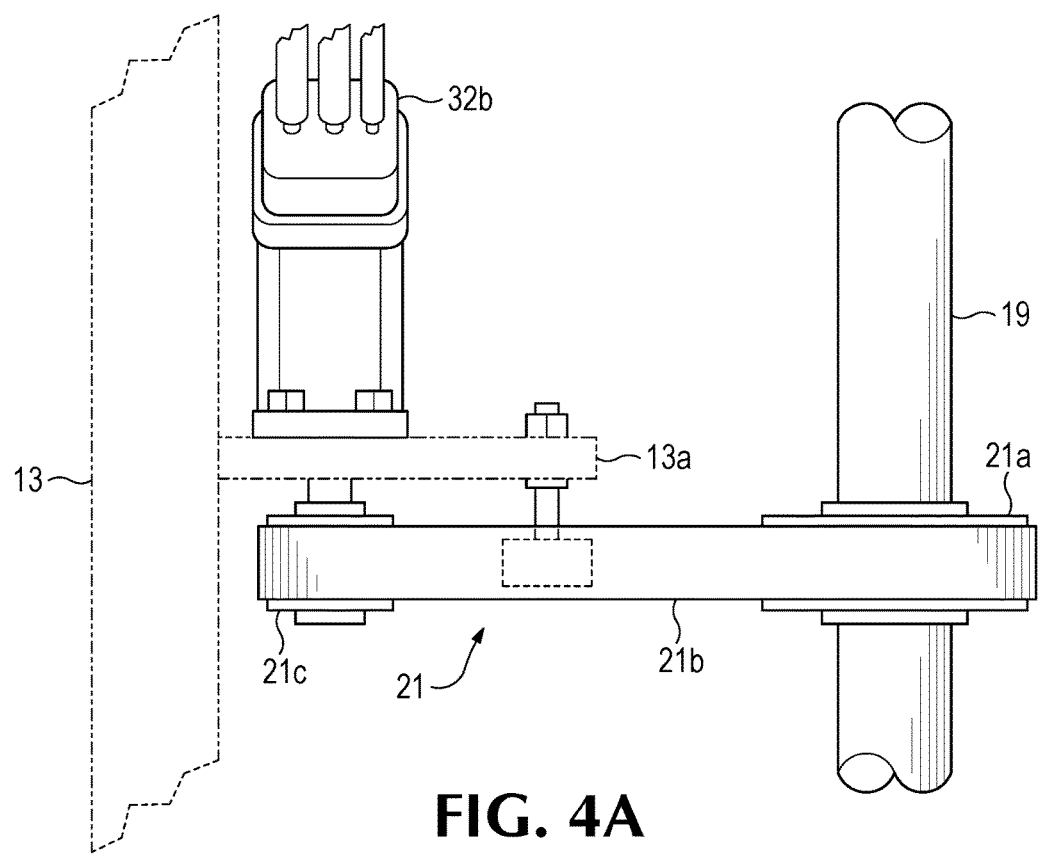
FIG. 4A is a fragmentary plan view of a second hydraulic pump mounted to a second portion of the frame of the tractor of FIGS. 1 and 2 and coupled to a drive shaft of the tractor through a belt system.
Figure 4B:
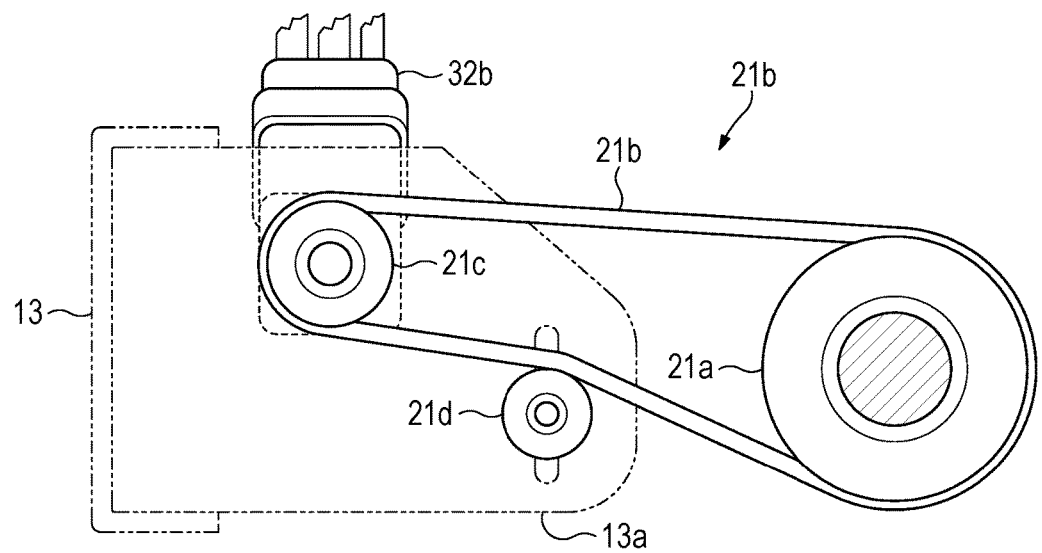
FIG. 4B is a fragmentary side view of the pump, drive shaft, and belt system of FIG. 4A.

In a preferred embodiment of the tractor/trailer combination 100, the road-wheel-driven pump 32b is driven by the driving road-wheels of the tractor 12 through the drive shaft 19. Referring to FIGS. 4A and 4B, the pump may be mounted to a portion of the frame 13 of the tractor (shown mounted to a bracket 13a which attached to the frame 13), the drive shaft 19 may be provided with a pulley 21a that drives a belt 21b, and the belt may drive a pulley 21c coupled to the pump 32b. The belt may be cogged or grooved. A spring-biased tensioner 21d may be added to accommodate movement of the drive shaft 19 relative to the frame 13.

As one alternative, the housing of the differential 20 could be specially adapted for accepting the pump 32b, which could be bolted directly to the housing and driven by a gear in the differential, the kinetic energy again being provided by the driven road-wheels.

However, there are many possible means for mounting the pump 32b to the tractor/trailer combination 100 and for driving the pump by road-wheels attached to either or both the tractor and trailer so as to draw mechanical power from the road-wheels as will be readily appreciated by those of ordinary skill, including means that employ intermediate mechanical, hydraulic, pneumatic, or electrical systems.

Referring briefly to FIG. 2, the pumps 32 provide fluid pressure to a hydraulic motor M that is part of a hydraulic power unit that will be described below.

The engine-driven pump 32a can draw power from the engine for powering the hydraulic power unit at any time the engine is running, i.e., whether the engine is propelling the tractor/trailer combination 100 or just idling. On the other hand, the road-wheel-driven pump 32b can only draw power from the kinetic energy of the tractor/trailer combination, so that the road-wheel-driven pump 32b can only be used to provide power to the hydraulic power unit when the tractor/trailer combination is moving. But the latter power source is recognized as being a generally more economical power source for the TRU 26 during such times. So it is an object of the present invention to provide the capability that, during such times, i.e., when the tractor/trailer combination has sufficient kinetic energy to power the TRU 26, the pump 32b may become the primary power source for the TRU 26, preferably providing all the power that is needed by the TRU 26.

Preferably, the hydraulic pumps 32 are of the "variable volume pressure compensated" type having a "pressure compensator" setting, which is typically user-adjustable. According to the invention, this pressure compensator setting can be used to avoid the need for additional electrical and/or mechanical means for switching from one pump to the other to achieve the desired result of using the pump 32b to provide all the power needed to power the TRU 26 when the kinetic energy of the tractor/trailer combination 100 is sufficient to do so. The present inventor has recognized that this functionality can be achieved simply by connecting the pumps 32 to hydraulic motor 34 in parallel and providing appropriate compensator settings for the two pumps.

The engine-driven pump 32a must be capable of providing all the power needed to drive the hydraulic motor 34 to satisfy the electrical power needs of the TRU 24 when the tractor/trailer combination 100 is parked and the engine 14 is idling. But by setting the pressure compensator of the engine-driven pump 32a at a higher pressure, e.g., 300-400 pounds per square inch (psi), than that of the road-wheel-driven pump 32b, e.g., 200 psi, the road-wheel-driven pump is enabled to relieve the engine-driven pump of essentially all of the load that the road-wheel-driven pump is capable of satisfying by itself. In such case, the engine-driven pump will cease to draw any significant power from the engine 14.

It has been found that, to reliably provide for this functionality, the pressure compensator of the engine-driven pump 32a is preferably set to be at least about 50 psi higher than the pressure compensator of the road-wheel-driven pump 32a, more preferably at least about 100 psi higher, and more preferably still at least about 200 psi higher.

The hydraulic pumps 32a, 32b each have an associated hydraulic fluid flow input power lines "$32a_{FLOW\text{-}INPUT}$" for the pump 32a, and "$32b_{FLOW\text{-}INPUT}$" for the pump 32b; and hydraulic fluid flow output power lines "$32a_{FLOW\text{-}OUTPUT}$" for the pump 32a, and "$32b_{FLOW\text{-}OUTPUT}$" for the pump 32b.

Figure 5:
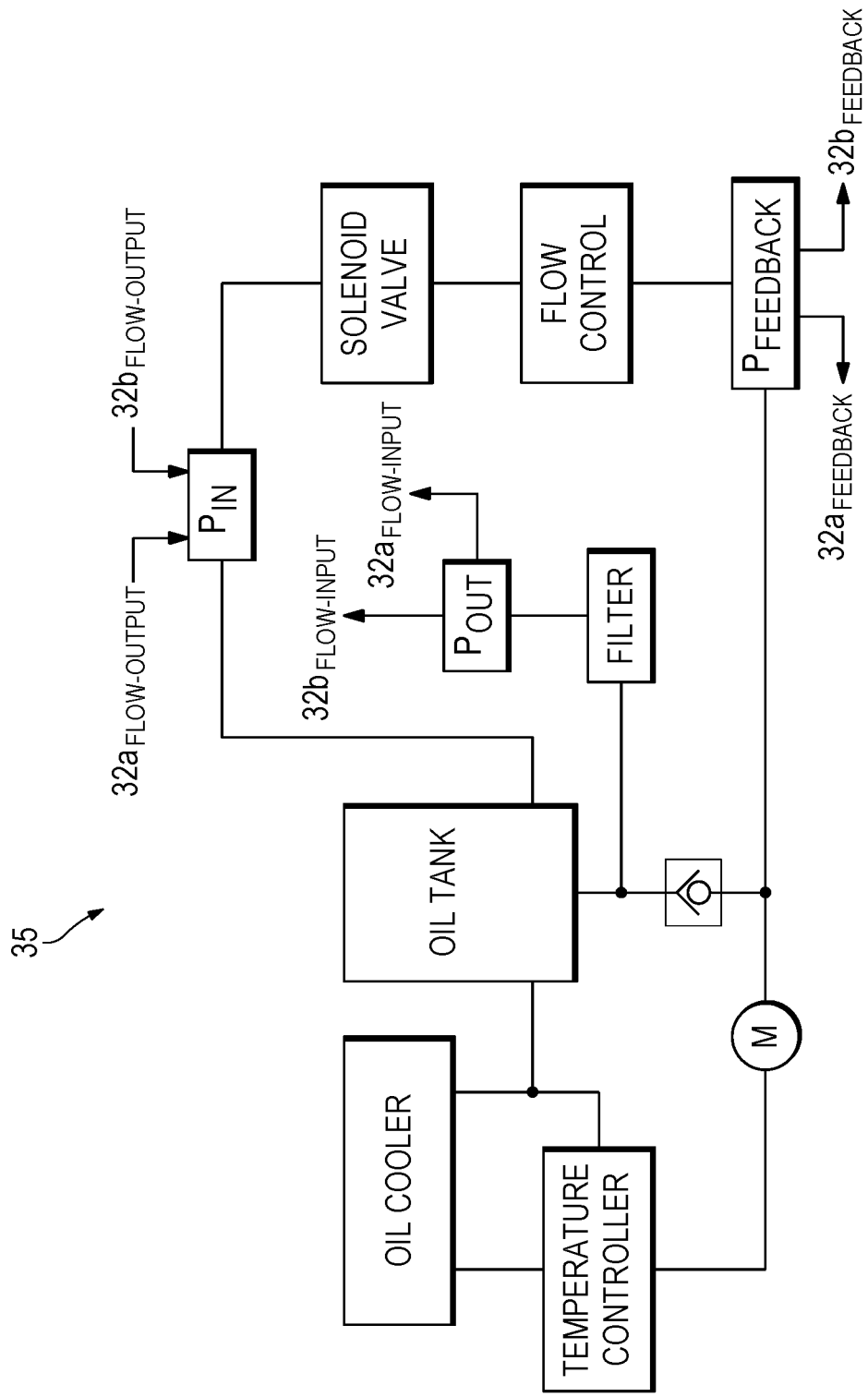
FIG. 5 is a schematic illustration of a hydraulic fluid control circuit for use with the system of FIG. 2.

These hydraulic fluid flow power lines are connected to a hydraulic fluid flow circuit 35 which is shown in FIG. 5. The fluid flow circuit 35 includes components that may be mounted anywhere to the tractor/trailer combination 100, separately or grouped together in any combinations as desired to form the circuit. In a preferred embodiment of the tractor/trailer combination, the fluid flow circuit 35 is provided with all of its components mounted together in a single enclosure 36 (FIG. 2) which is mounted to the frame 13 of the tractor 12, behind the cab such as shown in FIG. 2.

A number of these components are shown but are not further described as they are well known in the art. The features of the fluid flow circuit 35 that are particularly pertinent to the present invention is a pump power input connection "$P_{IN}$" for receiving pressurized fluid output from the hydraulic pumps 32a and 32b, and a hydraulic motor "M" driven by hydraulic fluid pressure supplied by the pumps 32. The hydraulic motor M produces a mechanical power output in the form of a rotating output shaft (not shown) from the fluid power input supplied by the pumps 32.

The output shaft of the motor M of the fluid flow circuit 35 is used to turn a generator "GEN" that may also be housed in the enclosure 36. The generator produces an electrical power output from the mechanical power output produced by the hydraulic motor M. An input shaft (also not shown) of the generator can be directly coupled to the output shaft of the hydraulic motor, or not, as desired.

Referring back to FIG. 2, an electrical power line 39 supplies electrical power from the generator GEN to the electric motor 26a of the TRU 26. Where the electric motor is adapted to be AC driven, the generator is preferably similarly adapted to produce and supply AC power to the electrical power line 39. However, this is not essential since DC power can be converted to AC power and vice versa.

The generator is preferably capable of providing all the electrical power needed to power the TRU 26; accordingly, the hydraulic motor is preferably capable of providing all the mechanical power needed to power the generator.

One end of the electrical power line 39 may be hardwired to the electric motor 26a of the TRU 26. The other end may have a power plug "PP," and the enclosure 36 may have a power outlet receptacle "PO" for matingly receiving the power plug PP to complete a power circuit between the generator and electric motor. In such case, preferably, the power plug PP is a standard male plug adapted for plugging in to a standard AC electrical outlet receptacle receiving power from the AC power grid and the power outlet receptacle PO is likewise the same type of electrical outlet receptacle, so that the TRU 26 can be plugged in to the on-board generator GEN to be powered by the hydraulic pumps 32, or it can be plugged in to the AC electrical power grid, or it can be plugged in to any other auxiliary source of AC electrical power employing a standard power outlet receptacle.

As noted generally above, the hydraulic fluid flow lines 32a$_{FLOW\text{-}OUTPUT}$ and 32b$_{FLOW\text{-}OUTPUT}$ are provided in parallel to the pump input connection $P_{IN}$, for powering the motor M.

Both pumps are therefore available to power the motor M. How they share the load depends on their respective compensator settings in relation to feedback obtained from the hydraulic fluid flow circuit 35. This feedback is provided through a pump feedback connection "$P_{FEEDBACK}$" of the hydraulic fluid flow circuit, in a "SENSOR" line running in parallel with a main flow line that takes hydraulic fluid from the pump power input connection $P_{IN}$ through a "FLOW CONTROL" module. Corresponding pump fluid feedback lines "32a$_{FEEDBACK}$" of the pump 32a and "32b$_{FEEDBACK}$" of the pump 32b are connected in parallel to the pump feedback connection of the fluid flow circuit 35.

The feedback provided at the pump feedback connection $P_{FEEDBACK}$ is provided as fluid pressure (no significant fluid flow occurs through the feedback lines).

The FLOW CONTROL module may be a needle valve or other flow control mechanism as known in the art that controls the amount of fluid flow through the fluid flow circuit 35 to be at approximately 10-14 gallons per minute (gpm), and preferably about 12 gpm.

While preferred embodiments of the invention have been described for use in a truck or tractor/trailer combination, and more specifically where the truck or tractor/trailer combination is driven by an internal combustion engine which is typically a diesel engine, specifically for powering a transport refrigeration unit, it should be appreciated that the principles of the invention apply as well to any engine-driven wheeled vehicle, to produce electrical or mechanical power, or both, for any purpose.

It is to be understood that, while specific method and system for generating electrical power from a wheeled engine-driven vehicle for powering a transport refrigeration unit has been shown and described as preferred, other configurations and methods could be utilized, in addition to those already mentioned, without departing from the principles of the invention.

The terms and expressions which have been employed in the foregoing specification are used therein as tell Is of description and not of limitation, and there is no intention in the use of such terms and expressions to exclude equivalents of the features shown and described or portions thereof, it being recognized that the scope of the invention is defined and limited only by the claims which follow.

The invention claimed is:

1. A system for generating power from a wheeled engine-driven vehicle, the system comprising:
    two hydraulic pumps for producing fluid power from mechanical power by pumping hydraulic fluid, a first one of the hydraulic pumps adapted for obtaining mechanical power from the engine of the vehicle and the second one of the hydraulic pumps adapted for obtaining mechanical power from one or more of the road-wheels of the vehicle; and
    a hydraulic circuit including a hydraulic motor, wherein hydraulic fluid pumped by the two hydraulic pumps is provided to the hydraulic circuit in parallel through a fluid power input of the hydraulic circuit, and wherein the hydraulic motor is adapted for producing mechanical power from fluid flowing through the fluid power input, through the hydraulic motor, and back out of the hydraulic circuit for re-supplying hydraulic fluid as needed to the first and second hydraulic pumps.

2. The system of claim 1, further comprising a generator for producing electrical power obtained from the mechanical power generated by the hydraulic motor.

3. The system of claim 2, further comprising a refrigeration unit attached to the vehicle adapted for being electrically driven by power obtained from the generator.

4. The system of claim 3, wherein the vehicle is a truck, wherein the one or more of the road-wheels are driven road-wheels of the truck, and wherein the refrigeration unit is a transport refrigeration unit for the truck.

5. The system of claim 4, wherein the two hydraulic pumps have respective fluid feedback inputs and pressure compensators responsive to the fluid feedback inputs, wherein the fluid feedback inputs of the two hydraulic pumps are adapted to obtain feedback for the feedback inputs from hydraulic fluid tapped from the hydraulic circuit downstream of the fluid power input of the hydraulic circuit and upstream of the hydraulic motor, wherein the pressure compensator for the first one of the pumps is set at least 50 psi higher than the pressure compensator for the second one of the pumps.

6. The system of claim 3, wherein the two hydraulic pumps have respective fluid feedback inputs and pressure compensators responsive to the fluid feedback inputs, wherein the fluid feedback inputs of the two hydraulic pumps are adapted to obtain feedback for the feedback inputs from hydraulic fluid tapped from the hydraulic circuit downstream of the fluid power input of the hydraulic circuit and upstream of the hydraulic motor, wherein the pressure compensator for the first one of the pumps is set at least 50 psi higher than the pressure compensator for the second one of the pumps.

7. The system of claim 2, wherein the two hydraulic pumps have respective fluid feedback inputs and pressure compensators responsive to the fluid feedback inputs, wherein the fluid feedback inputs of the two hydraulic pumps are adapted to obtain feedback for the feedback inputs from hydraulic fluid tapped from the hydraulic circuit downstream of the fluid power input of the hydraulic circuit and upstream of the hydraulic motor, wherein the pressure compensator for the first one of the pumps is set at least 50 psi higher than the pressure compensator for the second one of the pumps.

8. The system of claim 1, wherein the two hydraulic pumps have respective fluid feedback inputs and pressure compensators responsive to the fluid feedback inputs, wherein the fluid feedback inputs of the two hydraulic pumps are adapted to obtain feedback for the feedback inputs from hydraulic fluid tapped from the hydraulic circuit downstream of the fluid power input of the hydraulic circuit and upstream of the hydraulic motor, wherein the pressure compensator for the first one of the pumps is set at least 50 psi higher than the pressure compensator for the second one of the pumps.

9. A method for generating power from a wheeled engine-driven vehicle, the system comprising:
providing at least two hydraulic pumps for pumping hydraulic fluid through respective hydraulic fluid outputs of the hydraulic pumps;
driving a first one of the hydraulic pumps by the engine of the vehicle and driving a second one of the hydraulic pumps by one or more of the road-wheels of the vehicle; and
providing the hydraulic fluid outputs from the first and second hydraulic pumps in parallel to a hydraulic motor.

10. The method of claim 9, further comprising producing electrical power obtained from the mechanical power generated by the hydraulic motor.

11. The method of claim 10, wherein the two hydraulic pumps have respective fluid feedback inputs and pressure compensators responsive to the fluid feedback inputs, and wherein the hydraulic fluid outputs of the first and second hydraulic pumps are connected together in parallel at a fluid power input of a hydraulic circuit that supplies the hydraulic fluid output from the first and second hydraulic pumps to the hydraulic motor, the method further comprising obtaining feedback from hydraulic fluid tapped from the hydraulic circuit downstream of the fluid power input and upstream of the hydraulic motor, and setting a pressure compensator of the first one of the pumps to be at least 50 psi higher than the pressure compensator setting for the second one of the pumps.

12. The method of claim 10, further comprising using the electrical power to power a refrigeration unit attached to the vehicle.

13. The method of claim 12, wherein the two hydraulic pumps have respective fluid feedback inputs and pressure compensators responsive to the fluid feedback inputs, and wherein the hydraulic fluid outputs of the first and second hydraulic pumps are connected together in parallel at a fluid power input of a hydraulic circuit that supplies the hydraulic fluid output from the first and second hydraulic pumps to the hydraulic motor, the method further comprising obtaining feedback for the feedback inputs from hydraulic fluid tapped from the hydraulic circuit downstream of the fluid power input and upstream of the hydraulic motor, and setting a pressure compensator of the first one of the pumps to be at least 50 psi higher than the pressure compensator setting for the second one of the pumps.

14. The method of claim 9, wherein the two hydraulic pumps have respective fluid feedback inputs and pressure compensators responsive to the fluid feedback inputs, and wherein the hydraulic fluid outputs of the first and second hydraulic pumps are connected together in parallel at a fluid power input of a hydraulic circuit that supplies the hydraulic fluid output from the first and second hydraulic pumps to the hydraulic motor, the method further comprising obtaining feedback from hydraulic fluid tapped from the hydraulic circuit downstream of the fluid power input and upstream of the hydraulic motor, and setting a pressure compensator of the first one of the pumps to be at least 50 psi higher than the pressure compensator setting for the second one of the pumps.

* * * * *